US012725256B2

(12) United States Patent
Hasebe et al.

(10) Patent No.: US 12,725,256 B2
(45) Date of Patent: Sep. 1, 2026

(54) FIBROSIS EVALUATION METHOD FOR BIOLOGICAL SAMPLE

(71) Applicants: SCREEN Holdings Co., Ltd., Kyoto (JP); Cyfuse Biomedical K.K., Tokyo (JP)

(72) Inventors: Ryo Hasebe, Kyoto (JP); Toshihiko Maekawa, Tokyo (JP); Ayu Inoue, Tokyo (JP)

(73) Assignees: SCREEN Holdings Co., Ltd., Kyoto (JP); Cyfuse Biomedical K.K., Tokyo (JP)

( * ) Notice: Subject to any disclaimer, the term of this patent is extended or adjusted under 35 U.S.C. 154(b) by 274 days.

(21) Appl. No.: 18/599,334

(22) Filed: Mar. 8, 2024

(65) Prior Publication Data

US 2024/0303812 A1 Sep. 12, 2024

(30) Foreign Application Priority Data

Mar. 10, 2023 (JP) ................................. 2023-037282

(51) Int. Cl.
*G06T 7/00* (2017.01)

(52) U.S. Cl.
CPC .. *G06T 7/0012* (2013.01); *G06T 2207/10101* (2013.01); *G06T 2207/20081* (2013.01); *G06T 2207/30024* (2013.01); *G06T 2207/30056* (2013.01)

(58) Field of Classification Search
CPC ......... G06T 7/0012; G06T 2207/10101; G06T 2207/20081; G06T 2207/30024; G06T 2207/30056; G06T 2207/20084; G06T 2207/20224; G06T 7/12; G06T 7/136; G06T 7/62
See application file for complete search history.

(56) References Cited

U.S. PATENT DOCUMENTS

2012/0009086 A1* 1/2012 Nyberg ............... A61M 1/3479 422/44
2016/0349240 A1 12/2016 Fujimoto et al.
2019/0005684 A1* 1/2019 De Fauw ............... G06V 10/82
2020/0218874 A1* 7/2020 Koh .................... G06F 18/2411
2023/0019599 A1* 1/2023 Petitjean ............... G06T 7/0012

FOREIGN PATENT DOCUMENTS

EP 3 473 727 A1 4/2019
JP 2015-181348 A 10/2015

OTHER PUBLICATIONS

Extended European Search Report dated Jul. 12, 2024 of the corresponding European Patent Application No. 24154633.2.

* cited by examiner

*Primary Examiner* — Wassim Mahrouka
(74) *Attorney, Agent, or Firm* — Rimon P.C.

(57) ABSTRACT

According to an evaluation method, first, a biological sample is taken an image, and an image in which intensity values are distributed is acquired. After that, a localization region corresponding to a fibrotic region is extracted from the taken image. At that time, a region of which intensity value satisfies a predetermined requirement in the taken image is extracted as the localization region. Alternatively, the taken image is input to a trained model created in advance, and a localization region output from the trained model is obtained. This makes it possible to noninvasively observe the fibrotic region of the biological sample, to evaluate the condition of the biological sample, without processing cells by staining or the like.

3 Claims, 11 Drawing Sheets

FIBROSIS EVALUATION METHOD FOR BIOLOGICAL SAMPLE

RELATED APPLICATIONS

This application claims the benefit of Japanese Application No. 2023-037282, filed on Mar. 10, 2023, the disclosure of which is incorporated by reference herein.

BACKGROUND OF THE INVENTION

Field of the Invention

The present invention relates to an evaluation method for a biological sample.

Description of the Background Art

There is conventionally known an observation apparatus that images a biological specimen consisting of a plurality of cells by optical coherence tomography (OCT), and observes the biological specimen on the basis of the obtained tomographic image. Such a conventional observation apparatus as mentioned above is described in, for example, Japanese Patent Application Publication No. 2015-181348. With the use of this type of observation apparatus, it is possible to noninvasively observe a three-dimensional structure of a biological sample.

A biological sample such as a spheroid includes an unusual part in which the status of cells is different from that in the other parts, in some cases. For example, a liver spheroid may possibly be partly fibrosed during a culture process. Note that a liver spheroid is a spheroid obtained by three-dimensional culture of liver-derived cells including a hepatocyte.

As a conventional method for observing an unusual part such as a fibrotic region in a biological sample, a method of observing a target section using a fluorescent reagent is known. This method causes damage to an object being observed. Hence, there is a demand for a technology for observing an unusual part of a biological sample in a natural condition as it is without causing damage thereto.

SUMMARY OF THE INVENTION

The present invention has been made in view of the above-described situation, and it is an object of the present invention to provide an evaluation method that makes it possible to noninvasively observe a fibrotic region of a biological sample and evaluate the condition of the biological sample without damaging cells.

To solve the above-described problem, the first invention of the present application is directed to an evaluation method for a biological sample, including: an image acquisition step of imaging the biological sample by optical coherence tomography and acquiring an image; a region extraction step of extracting a fibrotic region in which a cell is fibrosed, from the taken image; and an evaluation step of analyzing the fibrotic region, to evaluate a condition of the biological sample.

The second invention of the present application is directed to the evaluation method of the first invention, wherein the region extraction step includes: a first extraction step of extracting an entire region corresponding to the biological sample from the taken image; a second extraction step of extracting a high-intensity region of which intensity value is higher than a predetermined threshold value in the entire region; and a third extraction step of extracting a region that is left after the high-intensity region and a region inner than the high-intensity region are excluded from the entire region, as the fibrotic region.

The third invention of the present application is directed to the evaluation method of the first invention or the second invention, wherein the evaluation step includes: a first calculation step of calculating an area of the entire biological sample in the taken image; and a second calculation step of calculating an area of the fibrotic region in the taken image.

The fourth invention of the present application is directed to the evaluation method of the third invention, wherein the evaluation step further includes a third calculation step of calculating an evaluation index on the basis of the area of the entire biological sample and the area of the fibrotic region.

The fifth invention of the present application is directed to the evaluation method of the first invention or the second invention, wherein the biological sample is a spheroid obtained by three-dimensional culture of a liver-derived cell including a hepatocyte.

The sixth invention of the present application is directed to an evaluation method for a biological sample, including: a training step of creating a trained model configured to receive an image of the biological sample taken by optical coherence tomography, as input information, and produce a fibrotic region in which a cell is fibrosed, as output information, by deep learning; an image acquisition step of imaging the biological sample by optical coherence tomography and acquiring the taken image; a region extraction step of inputting the taken image to the trained model, to acquire the fibrotic region output from the trained model; and an evaluation step of analyzing the fibrotic region, to evaluate a condition of the biological sample.

According to the first to fifth inventions of the present application, the fibrotic region can be extracted from the taken image of the biological sample. This makes it possible to noninvasively observe the fibrotic region of the biological sample and evaluate the condition of the biological sample without processing cells by staining or the like.

Especially, according to the second invention of the present application, the fibrotic region extending over the outer surface of the biological sample can be accurately extracted.

Especially, according to the third invention of the present application, the condition of the biological sample can be evaluated on the basis of the size of the fibrotic region.

Especially, according to the fourth invention of the present application, the condition of the biological sample can be evaluated on the basis of the size ratio of the fibrotic region to the entire biological sample.

Especially, according to the sixth invention of the present application, the fibrotic region can be accurately extracted from the taken image of the biological sample by using the trained model.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, a preferred embodiment of the present invention will be described with reference to the drawings.

<1. Configuration of Observation Apparatus>

Figure 1:
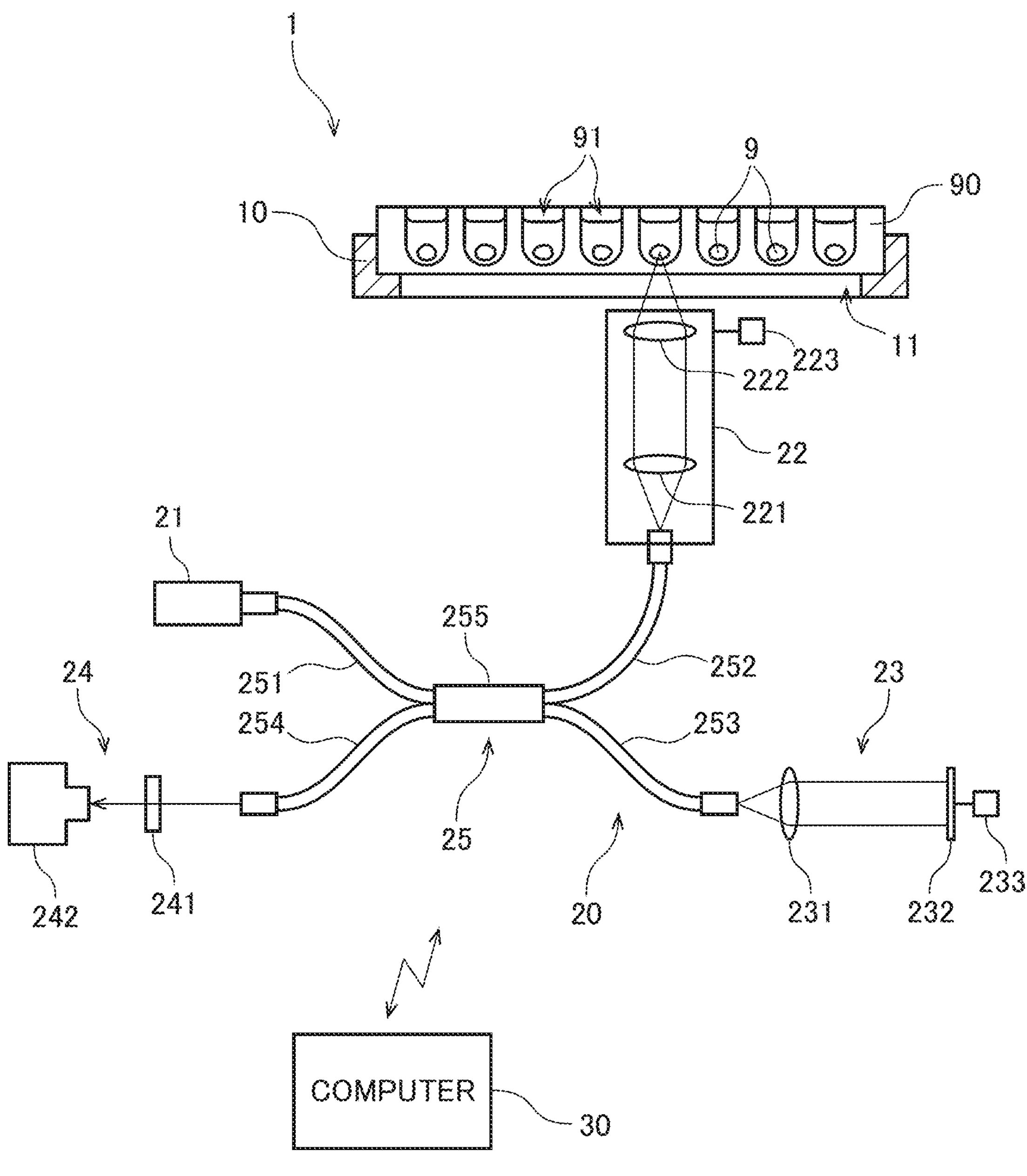
FIG. 1 is a diagram showing a configuration of an observation apparatus.

FIG. 1 is a diagram showing a configuration of an observation apparatus 1 according to one preferred embodiment of the present invention. The observation apparatus 1 is an apparatus that images a biological sample 9 held in a sample holder 90 and evaluates the condition of the biological sample 9 on the basis of the acquired image. The biological sample 9 to be observed and evaluated by the observation apparatus 1 may be any biological sample having a configuration or a structure that can cause fibrosis. As the biological sample 9, a so-called liver spheroid can be cited, for example. A liver spheroid is a cell aggregate including two or more kinds of cells including a liver parenchymal cell (hepatocyte) among multiple kinds of cells composing a liver. In addition to a liver parenchymal cell (hepatocyte), a hepatic sinusoidal endothelial cell, a Kupffer cell, a hepatic stellate cell, a pit cell, a bile duct epithelial cell, a mesothelial cell, and the like can be included.

As shown in FIG. 1, the observation apparatus 1 includes a stage 10, an imaging unit 20, and a computer 30.

The stage 10 is a support plate that supports the sample holder 90. For the sample holder 90, for example, a well plate is used. The well plate consists of multiple wells. The well 91 is a recessed portion that is recessed downward. Each of the wells 91 has a U-shaped or V-shaped bottom. The biological sample 9, together with a culture medium, is held near the bottom of each well 91. For a material of the sample holder 90, transparent resin or glass that transmits light is used.

The stage 10 includes an opening 11 that vertically penetrates. The sample holder 90 is horizontally supported while being fit in the opening 11 of the stage 10. Thus, the lower surface of the sample holder 90 is exposed toward the imaging unit 20 without being covered by the stage 10.

The imaging unit 20 is a unit that images the biological sample 9 in the sample holder 90. The imaging unit 20 is placed below the sample holder 90 supported by the stage 10. The imaging unit 20 of the present preferred embodiment is an optical coherence tomography (OCT) device capable of imaging the biological sample 9 to produce a tomographic image and a three-dimensional image thereof.

As shown in FIG. 1, the imaging unit 20 includes a light source 21, an object optical system 22, a reference optical system 23, a detection unit 24, and an optical fiber coupler 25. The optical fiber coupler 25 includes first to fourth optical fibers 251 to 254 connected at a connecting unit 255. The light source 21, the object optical system 22, the reference optical system 23, and the detection unit 24 are connected to each other via optical paths formed by the optical fiber coupler 25.

The light source 21 includes a light emitting element such as an LED. The light source 21 emits low-coherence light including a wide range of wavelength components. In order to allow light to reach the inside of the biological sample 9 without invasively treating the biological sample 9, it is desirable that light emitted from the light source 21 is a near-infrared ray. The light source 21 is connected to the first optical fiber 251. Light emitted from the light source 21 is incident on the first optical fiber 251 and is separated into light incident on the second optical fiber 252 and light incident on the third optical fiber 253 at the connecting unit 255.

The second optical fiber 252 is connected to the object optical system 22. Light traveling from the connecting unit 255 to the second optical fiber 252 is incident on the object optical system 22. The object optical system 22 includes a plurality of optical components including a collimator lens 221 and an object lens 222. Light emitted from the second optical fiber 252 passes through the collimator lens 221 and the object lens 222, and is applied to the biological sample 9 in the sample holder 90. At that time, the object lens 222 causes the light to converge to the biological sample 9. Then, light reflected from the biological sample 9 passes through the object lens 222 and the collimator lens 221 and is again incident on the second optical fiber 252. Hereinafter, the light reflected from the biological sample 9 will be referred to as "observation light".

As shown in FIG. 1, the object optical system 22 is connected to a scan mechanism 223. The scan mechanism 223 slightly moves the object optical system 22 vertically and horizontally in accordance with an instruction from the computer 30. Thus, the incidence position of light on the biological sample 9 can be slightly moved vertically and horizontally.

Further, the imaging unit 20 can be moved horizontally by a movement mechanism not shown. Thus, the field of view of the imaging unit 20 can be changed among the plurality of wells 91.

The third optical fiber 253 is connected to the reference optical system 23. Light travelling from the connecting unit 255 to the third optical fiber 253 is incident on the reference optical system 23. The reference optical system 23 includes a collimator lens 231 and a mirror 232. Light emitted from the third optical fiber 253 passes through the collimator lens 231 and is incident on the mirror 232. Then, light reflected from the mirror 232 passes through the collimator lens 231 and is again incident on the third optical fiber 253. Hereinafter, the light reflected from the mirror 232 will be referred to as "reference light".

As shown in FIG. 1, the mirror 232 is connected to a retraction mechanism 233. The retraction mechanism 233 slightly moves the mirror 232 in an optical-axis direction in accordance with an instruction from the computer 30. Thus, the optical-path length of the reference light can be changed.

The fourth optical fiber 254 is connected to the detection unit 24. The observation light that is incident on the second optical fiber 252 from the object optical system 22 and the reference light that is incident on the third optical fiber 253 from the reference optical system 23 join together at the connecting unit 255, and are incident on the fourth optical fiber 254. Then, light emitted from the fourth optical fiber 254 is incident on the detection unit 24. At that time, interference is caused between the observation light and the reference light due to a phase difference therebetween. The optical spectrum of interference light at that time varies with the height of reflection position of the observation light.

The detection unit 24 includes a spectroscope 241 and a light detector 242. The interference light emitted from the fourth optical fiber 254 is dispersed into each wavelength component in the spectroscope 241, and is incident on the light detector 242. The light detector 242 detects each dispersed interference light, and outputs its corresponding detection signal to the computer 30.

The image acquisition unit 41 described later in the computer 30 performs Fourier transform on the detection signal provided from the light detector 242, to thereby calculate a vertical light-intensity distribution of the observation light. Further, while the object optical system 22 is horizontally moved by the scan mechanism 223, the image acquisition unit 41 repeats the above-described calculation of light-intensity distribution, to thereby calculate a light-intensity distribution of the observation light at each coordinate position in a three-dimensional space. Consequently, the computer 30 can acquire a tomographic image and a three-dimensional image of the biological sample 9.

A tomographic image is formed of a plurality of pixels arranged on two-dimensional coordinates, and is data in which each pixel has a predetermined intensity value. A three-dimensional image is formed of a plurality of voxels arranged on three-dimensional coordinates, and is data in which each voxel has a predetermined intensity value. That is, each of a tomographic image and a three-dimensional image is a taken image in which intensity values are distributed on predetermined coordinates.

The computer 30 functions as a control unit that controls the operation of the imaging unit 20. Further, the computer 30 functions as a data processing unit that produces a tomographic image and a three-dimensional image on the basis of a detection signal input from the imaging unit 20 and evaluates the condition of the biological sample 9 on the basis of the acquired tomographic image and three-dimensional image.

Figure 2:
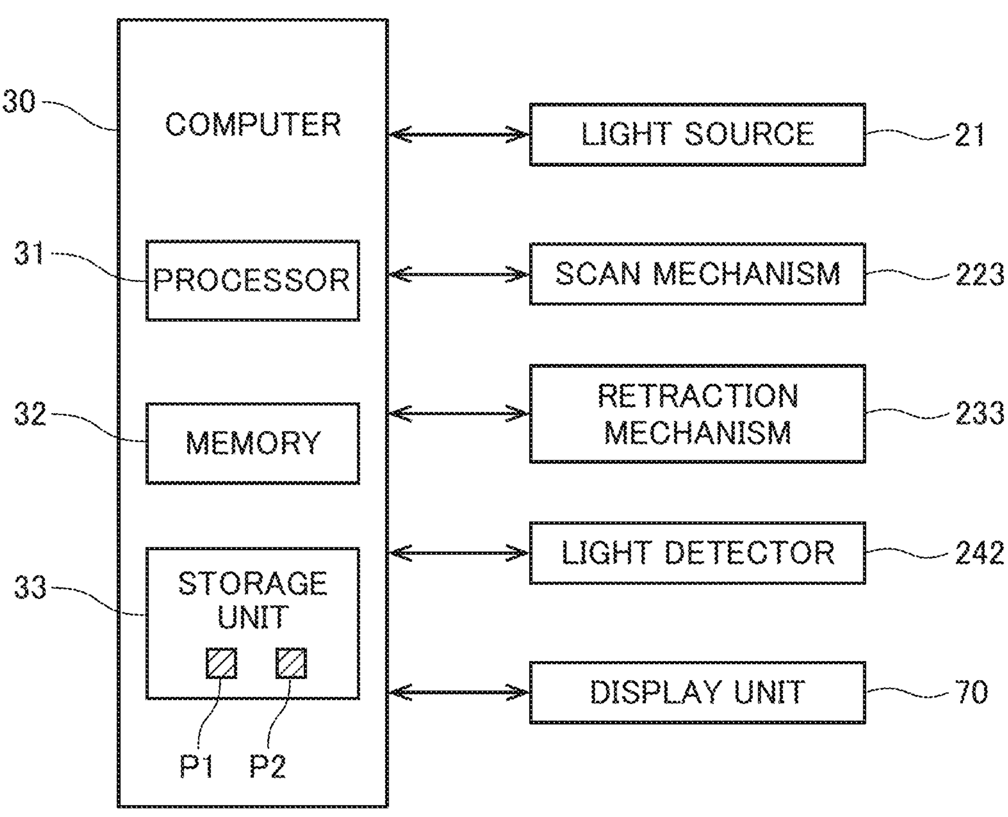
FIG. 2 is a control block diagram of the observation apparatus.

FIG. 2 is a control block diagram of the observation apparatus 1. As conceptually shown in FIG. 2, the computer 30 includes a processor 31 such as a CPU, a memory 32 such as a RAM, and a storage unit 33 such as a hard disk drive. In the storage unit 33, a control program P1 for controlling the operations of respective components in the observation apparatus 1 and a data processing program P2 for producing a tomographic image and a three-dimensional image and evaluating the condition of the biological sample 9, are stored.

Figure 3:
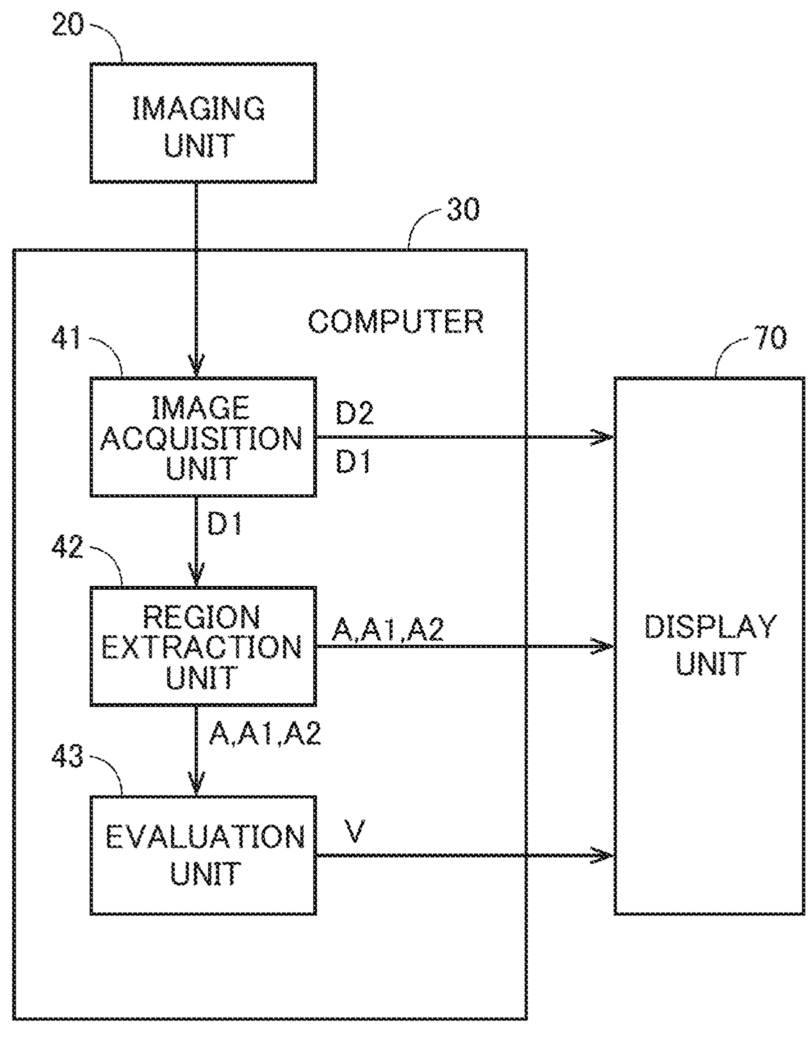
FIG. 3 is a block diagram conceptually showing functions of an image processing/evaluation apparatus.

Further, as shown in FIG. 3, the computer 30 is connected to the light source 21, the scan mechanism 223, the retraction mechanism 233, and the light detector 242 that have been described above, and to a display unit 70 described later such that the computer 30 can conduct communication with each of those components. The computer 30 controls the operations of the above-described respective components in accordance with the control program P1. Thus, an imaging process of the biological sample 9 held in the sample holder 90 proceeds.

FIG. 3 is a block diagram conceptually showing the functions of the computer 30 serving as an image processing/evaluation apparatus for observing and evaluating the biological sample 9. As shown in FIG. 3, the computer 30 includes the image acquisition unit 41, a region extraction unit 42, and an evaluation unit 43. The respective functions of the image acquisition unit 41, the region extraction unit 42, and the evaluation unit 43 are performed by an operation of the processor 31 of the computer 30 in accordance with the data processing program P2 described above. Details of processes performed by the image acquisition unit 41, the region extraction unit 42, and the evaluation unit 43 will be given later.

<2. Evaluation Process>

Next, description is given about an observation and evaluation process for the liver spheroid 9 in a case in which the liver spheroid is applied to a biological sample in the above-described observation apparatus 1.

Figure 4A:
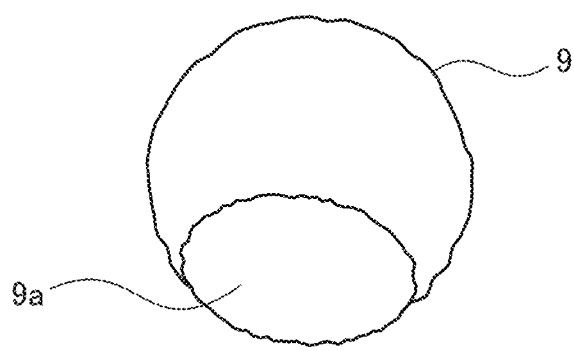
FIG. 4A is a picture schematically showing an example of a liver spheroid.
Figure 4B:
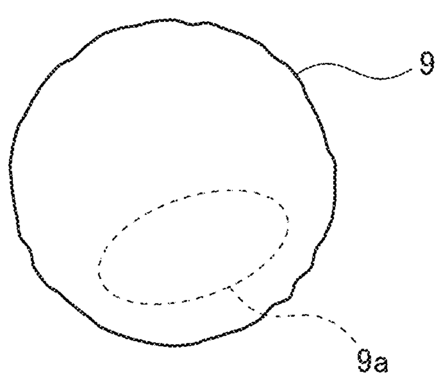
FIG. 4B is a picture schematically showing another example of a liver spheroid.

FIGS. 4A and 4B are pictures schematically showing examples of the liver spheroid 9 that is an object to be observed in the following description. The liver spheroid 9 shown in each of FIGS. 4A and 4B includes a fibrotic region **9*a* that is an object to be evaluated. The fibrotic region 9*a* is a portion of the liver spheroid 9 in which the condition of cells is different from that in the other portions. For example, the fibrotic region 9*a* is formed as scar tissue in which excessive connective tissue is accumulated as a result of repetition of damage and restoration of a partial region of the liver spheroid 9**.

For example, the fibrotic region **9*a* can be considered to be localized in the surface of (on the outside of) the liver spheroid 9 as shown in FIG. 4A, or be localized on the inner side of the liver spheroid 9 as shown in FIG. 4**B.

Figure 5:
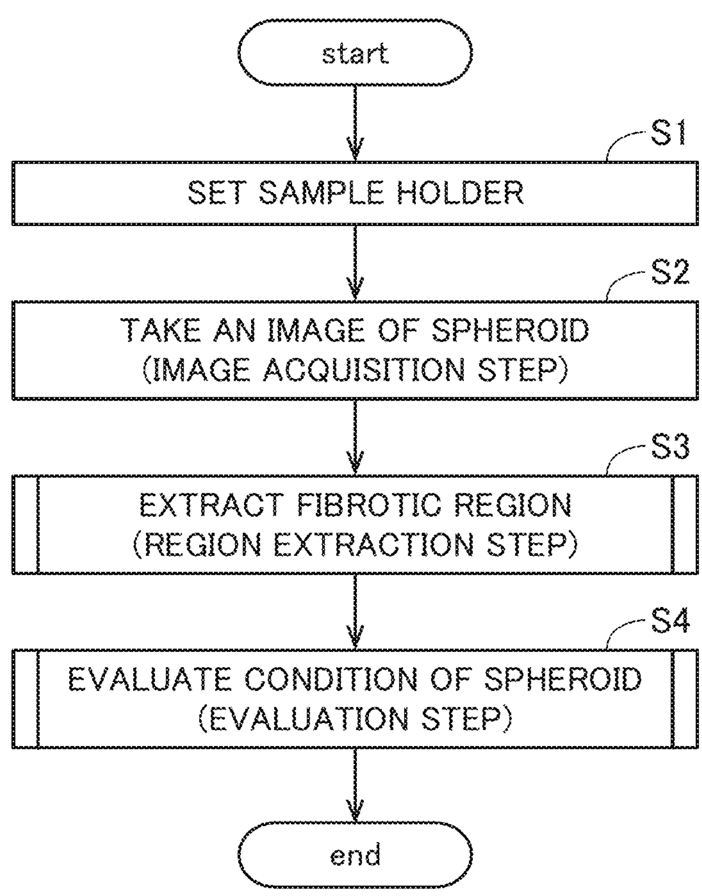
FIG. 5 is a flowchart showing a flow of an evaluation process.

FIG. 5 is a flowchart showing a flow of an evaluation process. In observing and evaluating the liver spheroid 9 in the observation apparatus 1, first, the sample holder 90 is set on the stage 10 (step S1). In the sample holder 90, the liver spheroid 9, together with a culture medium, is held.

Secondly, the observation apparatus 1 takes an image of the liver spheroid 9 with the use of the imaging unit 20 (step S2, image acquisition step). In the present preferred embodiment, the imaging unit 20 takes an image of by optical coherence tomography. Specifically, the light source 21 is caused to emit light, and interference light of observation light and reference light is detected for each wavelength component by the light detector 242 while the object optical system 22 is slightly moved by the scan mechanism 223. The image acquisition unit 41 of the computer 30 calculates a light-intensity distribution at each coordinate position of the liver spheroid 9 on the basis of a detection signal output from the light detector 242. Consequently, a tomographic image D1 and a three-dimensional image D2 of the liver spheroid 9 are acquired.

The observation apparatus 1 acquires a plurality of tomographic images D1 and one three-dimensional image D2 for one liver spheroid 9. Further, the observation apparatus 1 repeats the process of the step S2 while changing the well 91 to be imaged, to thereby acquire the tomographic images D1 and the three-dimensional images D2 of a plurality of liver spheroids 9. The acquired tomographic images D1 and three-dimensional images D2 are stored in the storage unit 33 of the computer 30. Moreover, the computer 30 displays the acquired tomographic images D1 and three-dimensional images D2 on the display unit 70.

Figure 6:
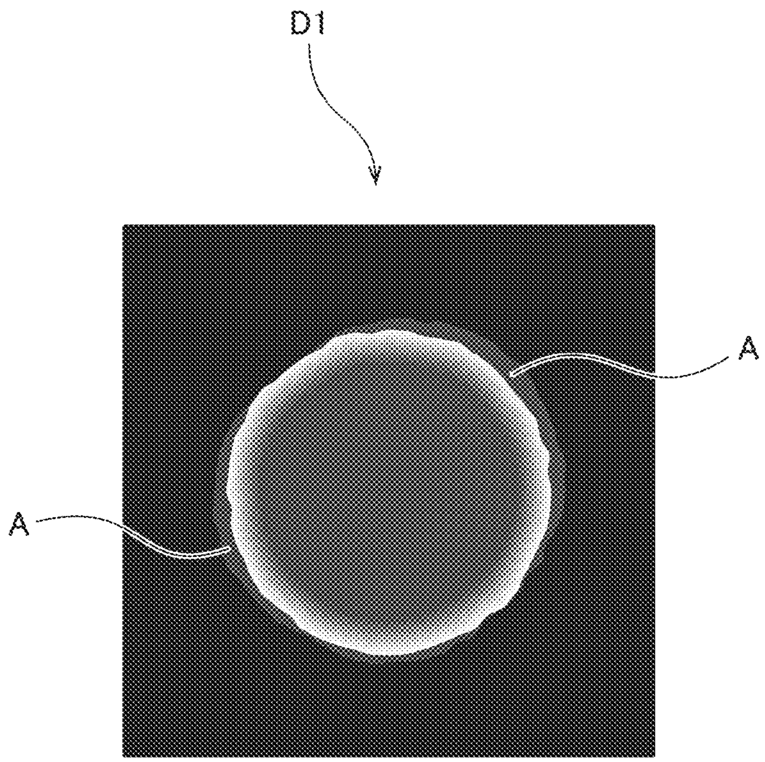
FIG. 6 is a view schematically showing a tomographic image.

FIG. 6 is a view schematically showing the tomographic image D1. In the example of FIG. 6, there is a region corresponding to the fibrotic region **9*a* in the outer edge of the liver spheroid 9 having a substantially spherical shape. Hereinafter, the region corresponding to the fibrotic region 9*a* will be referred to as a "localization region A". The region extraction unit 42 of the computer 30 extracts the localization region A from the tomographic image D1 (step S3**, region extraction step).

Figure 7:
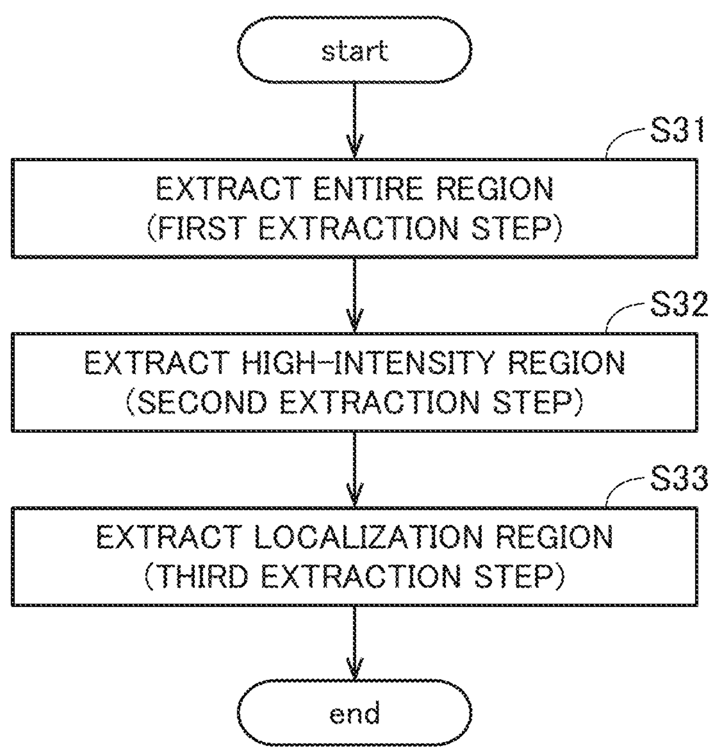
FIG. 7 is a flowchart showing an example of a flow of a region extraction step of evaluating a fibrotic region.
Figure 8:
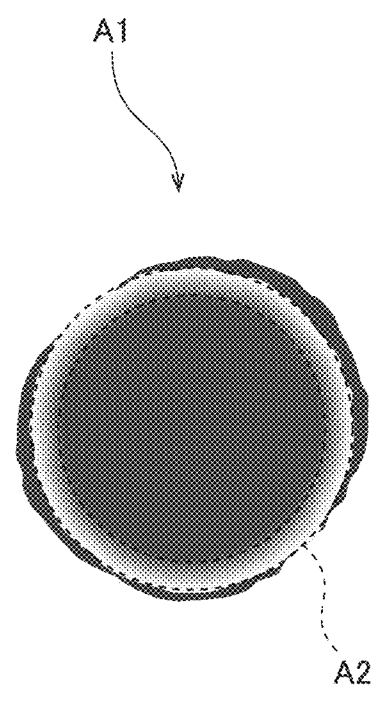
FIG. 8 is a view schematically showing a result of extraction of an entire region.

FIG. 7 is a flowchart showing an example of a flow of the region extraction step of the step S3 of extracting the fibrotic region 9*a* (localization region A) of the liver spheroid 9. In the example of FIG. 7, first, the region extraction unit 42 extracts an entire region A1 corresponding to the entire liver spheroid 9 from the tomographic image D1 (step S31, first extraction step). Specifically, the region extraction unit 42 extracts a region having an intensity value higher than a first threshold value set in advance in the tomographic image D1, as the entire region A1. FIG. 8 is a view schematically showing a result of extraction of the entire region A1.

Secondly, the region extraction unit 42 extracts a region having an intensity value higher than a predetermined second threshold value from the entire region A1, as a high-intensity region A2 (step S32, second extraction step). Note that the second threshold value is higher than the first threshold value. In FIG. 8, the high-intensity region A2 having a ring shape is indicated by a broken line. The outer edge of a cell aggregate having a substantially spherical shape has a strong tendency to have a high intensity. For this reason, in the step S32, the high-intensity region A2 is extracted, so that the outer edge of the cell aggregate having a substantially spherical shape is defined.

Figure 9:
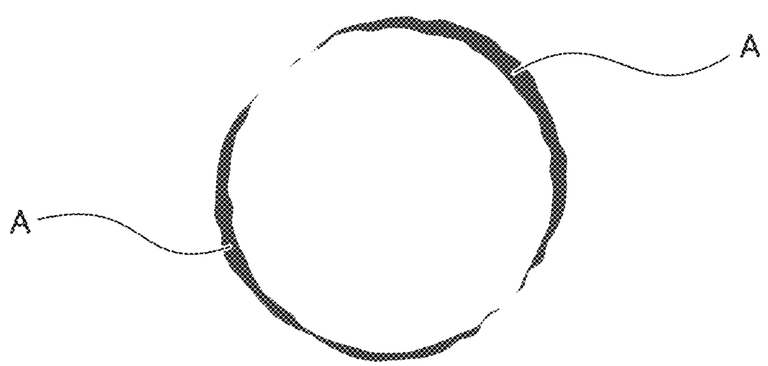
FIG. 9 is a view schematically showing a result of extraction of a fibrotic region.

Subsequently, the region extraction unit 42 extracts a region that is left after the high-intensity region A2 and a region inner than the high-intensity region A2 are excluded from the entire region A1, as the localization region A (step S33, third extraction step). FIG. 9 is a view schematically showing a result of extraction of the localization region A. Thus, the localization region A corresponding to the fibrotic region 9*a* extending over the outer surface of the cell aggregate having a spherical shape can be appropriately extracted.

In this manner, in the step S3, a region of which intensity value satisfies a predetermined requirement in the tomographic image D1 is extracted as the localization region A. The procedure for extracting the localization region A is not necessarily required to be the same as the above-described steps S31 to S33. The region extraction unit 42 is only required to extract the localization region A by following an appropriate procedure depending on the position or the intensity value of the localization region A.

After that, the evaluation unit 43 of the computer 30 evaluates the condition of the liver spheroid 9 on the basis of the localization region A extracted in the step S3 (step S4, evaluation step). In the step S4, the evaluation unit 43 analyzes the fibrotic region 9*a* in each of the tomographic image D1 and the three-dimensional image D2, to evaluate the condition of the spheroid 9.

Figure 10:
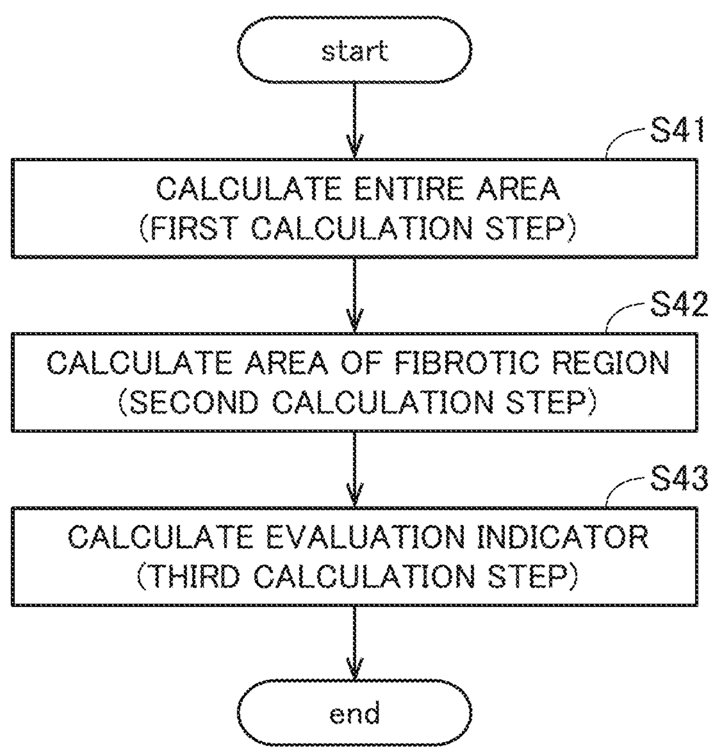
FIG. 10 is a flowchart showing an example of a flow of an evaluation step of evaluating a liver spheroid.

FIG. 10 is a flowchart showing an example of a flow of the evaluation step of the step S4 of evaluating the condition of the liver spheroid 9. In the evaluation step of the example of FIG. 10, the condition of the liver spheroid 9 is evaluated on the basis of the area of the localization region A in the tomographic image D1 that is a taken image.

In the example of FIG. 10, first, the evaluation unit 43 calculates the area of the entire spheroid 9 in the tomographic image D1 (step S41, first calculation step). Specifically, the evaluation unit 43 calculates the area of the entire region A1 in the tomographic image D1. The area of the entire region A1 can be calculated on the basis of the number of pixels included in the entire region A1, for example.

Secondly, the evaluation unit 43 calculates the area of the fibrotic region 9*a* in the tomographic image D1 (step S42, second calculation step). Specifically, the evaluation unit 43 calculates the area of the localization region A in the tomographic image D1. The area of the localization region A can be calculated on the basis of the number of pixels included in the localization region A, for example.

Subsequently, the evaluation unit 43 calculates an evaluation index on the basis of the area of the entire spheroid 9 calculated in the first calculation step of the step S41 and the area of the fibrotic region 9*a* calculated in the second calculation step of the step S42 (step S43, third calculation step). The evaluation index may be, for example, simply a ratio of the fibrotic region 9*a*, that is, a result of division of the area of the localization region A by the area of the entire region A1. Alternatively, the evaluation index may be, for example, a result of calculation in which the area of the localization region A and the area of the entire region A1 are substituted into an arithmetic expression determined in advance.

The evaluation method in the evaluation step of the step S4 may be another method. For example, in a case in which a plurality of tomographic images D1 are acquired for one liver spheroid 9, the evaluation unit 43 may calculate the respective volumes of the entire liver spheroid 9 and the fibrotic region 9*a* on the basis of the areas of the entire region A1 and the localization region A in each of the plurality of tomographic images D1, to calculate the evaluation index on the basis of the calculated volumes.

The evaluation unit 43 evaluates the condition of the liver spheroid 9 on the basis of the ratio represented as the calculated evaluation index. For example, in a case in which the evaluation index is an area ratio of the fibrotic region 9*a* in the liver spheroid 9, the smaller the numerical value of the evaluation index is, the more highly the evaluation unit 43 evaluates the condition of the liver spheroid 9.

The size (area or volume) of the fibrotic region 9*a*, the ratio of the fibrotic region 9*a*, and the evaluation index that are calculated by the evaluation unit 43 are stored in the storage unit 33, as evaluation values V. Further, the evaluation unit 43 displays the evaluation values V on the display unit 70.

As described above, the observation apparatus 1 can take an image of the liver spheroid 9 by optical coherence tomography and extract the localization region A corresponding to the fibrotic region 9*a* of the liver spheroid 9 from the acquired tomographic image D1. This enables noninvasive observation of the fibrotic region 9*a* of the liver spheroid 9 without processing cells by staining or the like. Further, by calculating the size of the fibrotic region 9*a*, it is possible to quantitatively evaluate the quality of the liver spheroid 9 easily. The liver spheroid 9 in which the fibrotic region 9*a* is localized can be put to various uses such as a fibrosis model, directly or in the form of a 3D liver-like structure created with the use of a bio 3D printer.

<3. Modifications>

Hereinabove, one preferred embodiment of the present invention has been described, but the present invention is not limited to the above-described preferred embodiment.

<3-1. First Modification>

Figure 11:
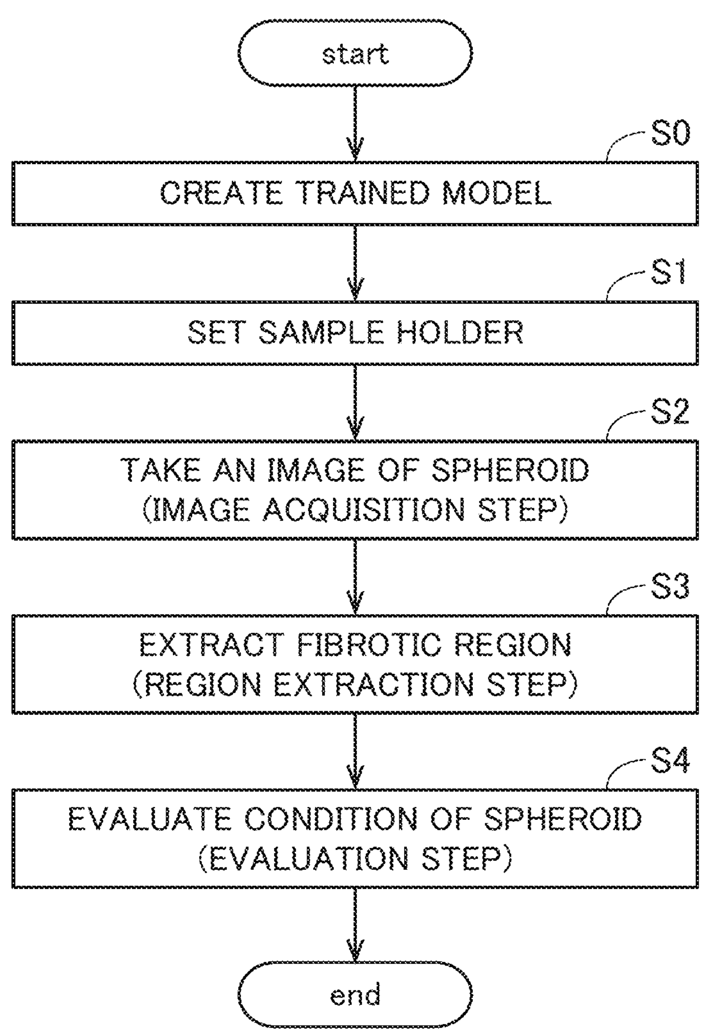
FIG. 11 is a flowchart showing a flow of an evaluation process in a case in which a trained model is used.

According to the above-described preferred embodiment, in the step S3, the region extraction unit 42 extracts a region of which intensity value satisfies a predetermined requirement in the tomographic image D1, as the localization region A. Alternatively, in the step S3, the region extraction unit 42 may extract the localization region A by using a trained model. FIG. 11 is a flowchart showing a flow of an evaluation process in a case in which a trained model is used.

In the example of FIG. 11, first, the computer 30 creates a trained model by deep learning (step S0, training step). The trained model is an input/output device configured to receive the tomographic image D1 of the liver spheroid 9 as input information and produce the localization region A corresponding to the fibrotic region 9*a* in the tomographic image D1 as output information. The computer 30 creates the trained model in accordance with a supervised machine learning algorithm by using a number of the tomographic images D1 prepared in advance and the localization regions A included in the tomographic images D1, as training data. The trained model is stored in the storage unit 33. For the machine learning algorithm, semantic segmentation can be used, for example, but the machine learning algorithm is not limited thereto.

After the trained model is created, the sample holder 90 is set on the stage 10 (step S1), and the liver spheroid 9 is taken an image (step S2, image acquisition step), in the same manner as in the above-described preferred embodiment. Subsequently, the region extraction unit 42 of the computer 30 extracts the localization region A corresponding to the fibrotic region 9*a* from the tomographic image D1 acquired by imaging (step S3). Specifically, the region extraction unit 42 inputs the tomographic image D1 acquired in the step S2 to the trained model created in the step S0. As a result of this, the localization region A is output from the trained model. This makes it possible to obtain the localization region A without performing processes such as the steps S31 to S33 described above.

<3-2. Second Modification>

The above-described preferred embodiment has discussed a case in which the localization region A is extracted from the tomographic image D1. Alternatively, the localization region A may be extracted from the three-dimensional image D2. In a case in which the three-dimensional image D2 is used for region extraction, a three-dimensional region corresponding to the fibrotic region 9*a* is extracted from three-dimensional coordinates forming the three-dimensional image D2, as the localization region A, in the step S3 described above. The extraction method in this case may be region extraction based on an intensity value, like that in the above-described preferred embodiment, or may be region extraction using a trained model, like that in the above-described first modification.

<3-3. Other Modifications>

According to the above-described preferred embodiment, the sample holder 90 is a well plate including the plurality of wells (recessed portions) 91, and each of the wells 91 holds one biological sample 9. Alternatively, one well may hold a plurality of biological samples. In such a case, one image may include regions respectively corresponding to the plurality of biological samples. Further alternatively, the sample holder that holds a biological sample may be a dish having only one recessed portion.

Moreover, the respective elements described in the above-described preferred embodiment and modifications may be appropriately combined unless contradiction occurs.

While the invention has been shown and described in detail, the foregoing description is in all aspects illustrative and not restrictive. It is therefore understood that numerous modifications and variations can be devised without departing from the scope of the invention.

What is claimed is:

1. An evaluation method for a biological sample, the evaluation method comprising:

an image acquisition step of imaging the biological sample by optical coherence tomography and acquiring an image;

a region extraction step of extracting, from the acquired image, a fibrotic region in which a cell is fibrosed; and an evaluation step of analyzing the fibrotic region, to evaluate a condition of the biological sample, wherein the biological sample is a spheroid obtained by three-dimensional culture of a liver-derived cell including a hepatocyte, and wherein the region extraction step includes:

a first extraction step of extracting, from the acquired image, a region having an intensity value higher than a first threshold value as an entire region corresponding to the biological sample;

a second extraction step of extracting, from the entire region, a high-intensity region having an intensity value higher than a predetermined second threshold value, the second threshold value being higher than the first threshold value; and a third extraction step of extracting, as the fibrotic region, a region remaining after excluding, from the entire region, the high-intensity region and a region inner than the high-intensity region.

2. The evaluation method according to claim 1, wherein the evaluation step includes:

a first calculation step of calculating an area of the entire biological sample in the acquired image; and a second calculation step of calculating an area of the fibrotic region in the acquired image.

3. The evaluation method according to claim 2, wherein the evaluation step further includes a third calculation step of calculating an evaluation index based on the area of the entire biological sample and the area of the fibrotic region.

* * * * *